(12) United States Patent
Debuisschert et al.

(10) Patent No.: US 8,692,040 B2
(45) Date of Patent: *Apr. 8, 2014

(54) PRODUCTION OF VAPOUR-CRACKING LOADS WITH A HIGH YIELD OF THE RESULTING ETHYLENE, PROPYLENE AND POLYMERS BY HYDROPROCESSING OF VEGETABLE OILS

(75) Inventors: Quentin Debuisschert, Rueil Malmaison (FR); Jean Cosyns, Maule (FR); Thierry Chapus, Lyons (FR); Damien Hudebine, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 891 days.

This patent is subject to a terminal disclaimer.

(21) Appl. No.: 12/664,132

(22) PCT Filed: Jun. 3, 2008

(86) PCT No.: PCT/FR2008/000755
§ 371 (c)(1),
(2), (4) Date: Jul. 27, 2010

(87) PCT Pub. No.: WO2009/004181
PCT Pub. Date: Jan. 8, 2009

(65) Prior Publication Data
US 2010/0292517 A1 Nov. 18, 2010

(30) Foreign Application Priority Data
Jun. 12, 2007 (FR) ...................... 07 04227

(51) Int. Cl.
*C07C 1/00* (2006.01)
(52) U.S. Cl.
USPC .......................................... 585/240; 585/242
(58) Field of Classification Search
USPC .............................. 585/240, 242; 44/605, 606
See application file for complete search history.

(56) References Cited

U.S. PATENT DOCUMENTS

| 4,992,605 | A | 2/1991 | Craig et al. | |
| 7,232,935 | B2 * | 6/2007 | Jakkula et al. | ............... 585/240 |
| 7,459,597 | B2 * | 12/2008 | Koivusalmi et al. | .......... 585/733 |
| 7,880,043 | B2 * | 2/2011 | Chapus et al. | ................. 585/240 |
| 7,888,542 | B2 * | 2/2011 | Koivusalmi et al. | .......... 585/327 |
| 7,999,142 | B2 * | 8/2011 | Kalnes et al. | ................. 585/240 |
| 8,026,401 | B2 * | 9/2011 | Abhari et al. | ................. 585/240 |
| 2004/0230085 | A1 | 11/2004 | Jakkula et al. | |

FOREIGN PATENT DOCUMENTS

| EP | 1140743 | | 10/2001 |
| EP | 1693432 | A1 | 8/2006 |
| EP | 1728844 | A1 | 12/2006 |
| WO | 9910450 | A | 3/1999 |
| WO | 2006100584 | A2 | 9/2006 |
| WO | 2009004180 | A2 | 1/2009 |
| WO | PCTFR0800755 | R | 4/2009 |

OTHER PUBLICATIONS

Coenin, J.W.E. et al., "Hydrogenation of Edible Oils." (Journal of American Oil Chemists' Society), Jun. 6, 1976, 382-389, 53:6.
Gusmao, J et al., "Utilization of Vegetable Oils as an Alternative Source for Diesel-Type Fuel: Hydrocracking on Reduced Ni/SiO2 and Sulphided NiMo/gamma-Al2O3." (Catalysis Today), 1989, 533-544, 5:4.
Senol, O.I. et al., "Hydrodeosygenation of methyl esters on sulphided NiMo/y—Al2O3 and CoMo/y—Al2O3 catalysts." (Catalysis Today), Jan. 18, 2005, 331-335, 100:18.
Stumborg, Mark et al. "Hydroprocessed Vegetable Oils for Diesel Fuel Improvement." (Bioresource Technology), Apr. 1, 1996, 13-18, 16:1.

* cited by examiner

*Primary Examiner* — Nina Bhat
(74) *Attorney, Agent, or Firm* — Millen, White, Zelano & Branigan, P.C.

(57) ABSTRACT

The invention describes a process for treatment of a feedstock that is obtained from a renewable source that comprises a hydrotreatment stage in the presence of at least one fixed-bed catalyst, whereby said catalyst comprises a hydro-dehydrogenating function and an amorphous substrate, at a temperature of between 50 and 450° C., at a pressure of between 1 MPa and 10 MPa, at an hourly volumetric flow rate of between 0.1 h−1 and 10 h−1, and in the presence of a total quantity of hydrogen that is mixed with the feedstock such that the hydrogen/feedstock ratio is between 50 and 1000 Nm3 of hydrogen/m3 of feedstock, followed by a separation from the hydrotreated effluent that is obtained from stage a) of hydrogen, gases, and at least one liquid hydrocarbon effluent that consists of at least 50% linear n-paraffins, and a steam-cracking of at least one portion of the liquid hydrocarbon effluent that is obtained from stage b).

16 Claims, No Drawings

PRODUCTION OF VAPOUR-CRACKING LOADS WITH A HIGH YIELD OF THE RESULTING ETHYLENE, PROPYLENE AND POLYMERS BY HYDROPROCESSING OF VEGETABLE OILS

This application claims benefit under 371 of National Stage entry of PCT/FR2008/000755 filed Jun. 3, 2008.

FIELD OF THE INVENTION

The dwindling supplies and the increase in the prices of petroleum products are leading to the search for replacements. In this context, the products made from biomass are especially attractive. Today, the use of biomass is oriented for the most part toward two lines: the bioester line that transforms vegetable oils into methyl esters before incorporation into the diesel fuel pool, and the ethanol line that transforms sugars and starch into ethanol or into ETBE (ethyl tert-butyl ether) before incorporation into the gasoline pool. Currently, the production costs of these bio products are high relative to fossil fuels and are only advantageous economically owing to significant fiscal incentives.

Furthermore, the availability of land that can be cultivated would not allow, according to the experts, more than 10% of the current fuel consumption to be produced.

In contrast, the production of light olefins for petrochemisty involves tonnages that are much lower than those that are necessary for fuels. Consequently, the biomass here can provide a very significant contribution to petrochemistry, and through the proposed invention, it could be considered possible in the long run to produce a significant proportion of "bio" polymers (essentially based on ethylene and propylene) from renewable feedstocks.

The invention that is described here is part of this context. It consists in hydrotreating feedstocks that are obtained from renewable sources and in particular in hydrogenating vegetable oils so as to obtain linear paraffins that contain 6 to 25 carbon atoms. These paraffins are then sent into a steam-cracking installation (or steam-cracking according to the English definition) that is sized as for the treatment of petroleum fractions but can also transform these paraffins into ethylene and propylene and polymers created with clearly superior yields.

The objective of the invention is therefore the production, with very high yields, of ethylene and propylene from a paraffin fraction that is obtained from the hydrotreatment of feedstocks that are obtained from renewable sources.

PRIOR ART

The patent U.S. Pat. No. 4,620,050 (ATOCHEM) describes a process for the production of ethylene that has a high purity or a mixture of ethylene/carbon monoxide that can be used directly by gas-phase decompositions of certain ethyl esters of aliphatic carboxylic acids at a temperature of between 150 and 300° C. in the presence of a zeolitic catalyst.

The patent application US 2007/0015947 describes a process for the production of C2-C5 olefins from feedstocks that are obtained from a renewable source that comprises a first stage for pretreatment of the feedstock that is designed to eliminate contaminants such as alkaline metals and a second stage for cracking the purified feedstock in a fluidized catalytic cracking (FCC) zone.

OBJECT OF THE INVENTION

A process for treatment of a feedstock that is obtained from a renewable source has now been found, and said process comprises the following stages:

a) Hydrotreatment in two stages in which said first stage of treatment that consists of a mild prehydrogenation operates at a temperature of between 50 and 300° C., at a partial hydrogen pressure of between 0.1 and 10 MPa, and at an hourly volumetric flow rate on the catalyst of between 0.1 h−1 and 10 h−1, in which said prehydrogenation catalyst comprises at least one noble metal of group VIII that is selected from among palladium and platinum or comprises at least one non-noble metal of group VIII and/or at least one metal of group VIB, whereby the non-noble metal of group VIII is selected from among nickel and cobalt and the metal of group VIB is selected from among molybdenum and tungsten, whereby said prehydrogenation catalyst is a metal-phase catalyst, and in which said second treatment stage operates at a temperature of between 200 and 450° C., at a pressure of between 1 MPa and 10 MPa, at an hourly volumetric flow rate on the catalyst of between 0.1 h−1 and 10 h−1, and at a total quantity of hydrogen mixed with the feedstock, such that the hydrogen to feedstock ratio is between 50 and 1,000 Nm3 of hydrogen per m3 of feedstock, in which said catalyst of the second treatment stage comprises at least one non-noble metal of group VIII and/or VIB, whereby the non-noble metal of group VIII is selected from among nickel and cobalt, and whereby the metal of group VIB is selected from among molybdenum and tungsten and is a sulfide-phase catalyst, b) Separation from the hydrotreated effluent that is obtained from stage a) of hydrogen, gases, and at least one liquid hydrocarbon effluent that consists of at least 50% by weight of linear n-paraffins, c) Steam-cracking of at least a portion of the liquid hydrocarbon effluent that is obtained from stage b).

The starting feedstocks are obtained from renewable sources, such as the oils and fats of vegetable or animal origin, or mixtures of such feedstocks, containing triglycerides and/or fatty acids and/or esters. Among the possible vegetable oils, they can be raw or refined, total or partial, and obtained from the following vegetables: canola, sunflower, soy, palm, palm-kernel, olive, coconut, whereby this list is not limiting. Among the possible fats, it is possible to cite all of the animal fats such as lard or fats that are composed of waste from the food industry or obtained from catering industries.

The thus defined feedstocks contain triglyceride and/or fatty acid structures and their esters, whose fatty chains contain a number of carbon atoms of between 6 and 25.

The hydrocarbons that are produced during the conversion of the starting feedstocks are characterized by:

a) A number of carbon atoms that is equal to that of the starting fatty acid chains, if the mechanism is a mechanism for hydrogenation of the carboxylic group into an alkyl group.

b) A hydrocarbon chain that has one carbon atom less than the starting fatty acid chains, if the mechanism involved is a decarboxylation/decarbonylation mechanism.

The mechanism a) has the advantage of offering a very good paraffin yield with a carbon number that is equivalent to that of the starting fatty acid, but in contrast has the drawback of entraining a very large hydrogen consumption that can range up to 3.6% by weight of hydrogen.

The mechanism b) has the drawback of a slightly smaller yield by weight that is linked to the reduction by one carbon atom of the chain that passes, for example, from C18 to C17 for canola oil, but in contrast makes it possible to limit the H2 consumption to only 1.6% by weight.

One of the advantages of the invention is to optimize the consumption of hydrogen in the hydrogenation mechanism according to a) while minimizing the decarboxylation/decarbonylation mechanism according to b).

DESCRIPTION OF THE INVENTION

One objective of this invention is the preparation of feedstocks of a steam-cracking device that makes it possible to obtain very high ethylene and propylene and polymer yields that are created from feedstocks that are obtained from renewable sources.

These feedstocks that are obtained from renewable sources consist of all of the vegetable oils and animal fats, essentially containing triglycerides and fatty acids or esters, with fatty hydrocarbon chains that have a number of carbon atoms of between 6 and 25. These oils can be palm, palm-kernel, copra, castor and cotton oils, the oils of peanuts, flax, and seacabbage, and all of the oils that are obtained from, for example, sunflower or rapeseed by genetic modification or hybridization. The oils for frying, varied animal oils such as fish oils, tallow, and lard can be used.

These feedstocks are partially or totally free of sulfur and nitrogen compounds and do not contain aromatic hydrocarbons.

Advantageously, prior to the stage a) of the process according to the invention, the feedstock can undergo a stage for pretreatment or pre-refining so as to eliminate, by a suitable treatment, contaminants such as metals, alkaline compounds, alkaline-earths and phosphorus, for example on ion exchange resins. Suitable treatments can be, for example, heat treatments and/or chemical treatments that are well known to one skilled in the art.

Stage a)

According to the invention, stage a) for hydrotreatment of feedstocks that are obtained from renewable sources is implemented in two stages.

Hydrotreatment of a Feedstock that is Obtained from Renewable Sources in Two Integrated Stages.

Stage a) advantageously consists of a first treatment stage that consists of a mild prehydrogenation of at least 50% of the double bonds that are contained in the hydrocarbon chains of the fatty acids of said feedstock, preferably at least 80% of the double bonds, very preferably at least 90% of the double bonds, and even more preferably at least 99% of the double bonds, followed by a second treatment stage that consists of hydrogenation of at least 50% of the ester groups that are contained in the hydrocarbon chains of the fatty acids of said feedstock, preferably at least 80% of the double bonds, very preferably at least 90% of the ester groups, and even more preferably at least 99% of the ester groups.

According to a preferred embodiment of the process according to the invention, stage a) consists of a first treatment stage that consists of a mild prehydrogenation of at least 50% of the double bonds that are contained in the hydrocarbon chains of the fatty acids of said feedstock, followed by a second treatment stage that consists of a hydrogenation of at least 50% of the ester groups that are contained in the hydrocarbon chains of the fatty acids of said feedstock.

According to a very preferred embodiment of the process according to the invention, stage a) consists of a first treatment stage that consists of mild prehydrogenation of at least 90% of the double bonds that are contained in the hydrocarbon chains of the fatty acids of said feedstock, followed by a second treatment stage that consists of hydrogenation of at least 90% of the ester groups that are contained in the hydrocarbon chains of the fatty acids of said feedstock.

According to a more preferred embodiment of the process according to the invention, stage a) consists of a first treatment stage that consists of a mild prehydrogenation of at least 99% of the double bonds that are contained in the hydrocarbon chains of the fatty acids of said feedstock, followed by a second treatment stage that consists of a hydrogenation of at least 99% of the ester groups that are contained in the hydrocarbon chains of the fatty acids of said feedstock.

The double bonds of the hydrocarbon chains can be measured by several analytical methods:

Measurement of the iodine index consists in measuring the quantity of diiodine ($I_2$) that can be fixed for the unsaturations of the hydrocarbon chains. The measured value is therefore expressed by mg of $I_2$ fixed on 100 g of product. Applied to fatty acids, the iodine index is, for example, 90 on oleic acid, 181 for linoleic acid, and 274 for linolenic acid. The iodine index is measured in the methyl esters of vegetable oils (EMHV), according to the EN14111 normalized method. It is also possible to cite the ASTM D1959 and ASTM D5554 methods from among the other normalized methods.

Measurement of the bromine index or the bromine number is a measurement by potentiometry. The bromine index is applied for contents that are less than 1000 mg/100 g of product, according to the ASTM D2710 standard. The bromine number relates to dosages by potentiometry for contents of greater than 1 g/100 g of product, according to the ASTM D1159 standard.

The presence of ester groups is demonstrated according to an infrared spectrometry method. The principle of the method rests on the presence of a specific infrared band of the ester group. The hydrogenation of the ester groups is therefore reflected by a disappearance of the specific band that is detected by infrared.

The first stage for treatment of said feedstock that consists of a mild prehydrogenation is designed to saturate the double bonds that are contained in the hydrocarbon chains of the fatty acids of the feedstock so as to prevent the secondary reactions of the double bonds, such as, for example, polymerization reactions that end in the formation of coke or gums. This first prehydrogenation stage operates according to the invention at a temperature of between 50 and 300° C., preferably between 50 and 200° C., and even more preferably between 100 and 200° C., and at a partial hydrogen pressure of between 0.1 and 10 MPa. The hourly volumetric flow rate on the catalyst is between $0.1 \text{ h}^{-1}$ and $10 \text{ h}^{-1}$.

The quantity of hydrogen that is consumed during this mild prehydrogenation stage is between 0.5 and 1% by weight of hydrogen relative to the feedstock.

The catalyst that is used in the first stage for treatment of the feedstock, called prehydrogenation catalyst, advantageously comprises at least one hydro-dehydrogenating element and a substrate such as alumina and/or silica and/or silica-alumina.

According to the invention, said prehydrogenation catalyst comprises at least one noble metal of group VIII that is preferably selected from among palladium and platinum, whereby said prehydrogenation catalyst is a metal-phase catalyst.

According to another alternative of the invention, said prehydrogenation catalyst comprises at least one non-noble metal of group VIII and/or one metal of group VIB, whereby the non-noble metal of group VIII is selected from among nickel and cobalt, and whereby the metal of group VIB is selected from among molybdenum and tungsten, whereby said prehydrogenation catalyst is a metal catalyst.

The content of noble or non-noble metal of group VIII is advantageously between 0.5 and 20% by weight and preferably between 5 and 10% by weight relative to the total mass of the catalyst. The metal content of group VIB is between 0.5 and 20% by weight and preferably between 7 and 17% by weight relative to the total mass of the catalyst.

Very preferably, the non-noble metal of group VIII is nickel, and the metal of group VIB is molybdenum.

Advantageously, the following metal combinations are also used: nickel-molybdenum and cobalt-molybdenum.

Very preferably, said prehydrogenation catalyst is a metal-phase catalyst whose metal phase consists of nickel alone.

The effluent that is obtained from this first mild prehydrogenation stage is then brought into contact in a second stage for treatment of said feedstock with a heterogeneous catalyst, whereby said second treatment stage operates at a temperature of between 200 and 450° C. and preferably between 220 and 350° C. The pressure is between 1 MPa and 10 MPa and preferably between 2 MPa and 6 MPa. The hourly volumetric flow rate in the catalyst is between $0.1\ h^{-1}$ and $10\ h^{-1}$. The feedstock is brought into contact with the catalyst in the presence of hydrogen. The total quantity of hydrogen that is mixed with the feedstock is such that the ratio of hydrogen to feedstock is between 50 and 1,000 $Nm^3$ of hydrogen per $m^3$ of feedstock and preferably between 100 and 500 $Nm^3$ of hydrogen per $m^3$ of feedstock. The hydrogen consumption during this second stage is typically between 2 and 3% by weight relative to the starting feedstock.

Said second stage for treatment of the feedstock, operating at stricter operating conditions than those of said first mild prehydrogenation stage, advantageously makes possible the hydrogenation of at least 50% of the ester groups that are contained in the hydrocarbon chains of fatty acids of the feedstock, preferably at least 80%, preferably at least 90%, and even more preferably at least 99% of the ester groups.

The presence of ester groups is demonstrated according to the method of infrared spectrometry that is defined above.

In this second stage for treatment of the feedstock, at least one fixed catalyst bed that comprises a hydrogenating group that is dispersed on a suitable substrate is used.

The substrate of the catalyst that is used in the second stage for treatment of the feedstock is advantageously selected from the group that is formed by alumina, silica, silica-aluminas, magnesia and clays, taken by themselves or mixed. Said substrate can advantageously also contain other compounds, such as, for example, oxides that are selected from the group that is formed by boron oxide, titanium oxide, and phosphoric anhydride, taken by themselves or mixed. Preferably an alumina substrate, and even more preferably a η-, δ-, or γ-alumina substrate, is used.

The hydrogenating group is advantageously ensured by at least one metal of group VIII and/or group VIB.

According to the invention, the catalyst that is used in the second stage for treatment of the feedstock of the process according to the invention comprises at least one non-noble metal of group VIII and/or at least one metal of group VIB, whereby the non-noble metal of group VIII is selected from among nickel and cobalt, and the metal of group VIB is selected from among molybdenum and tungsten, whereby said catalyst is a sulfide-phase catalyst.

Very preferably, the non-noble metal of group VIII is nickel, and the metal of group VIB is molybdenum.

The total content of metal oxides of groups VIB and VIII in the catalyst that is used in the second stage for treatment of the feedstock is advantageously between 5 and 40% by weight and preferably between 7 and 30% by weight relative to the total mass of the catalyst.

The ratio by weight that is expressed in terms of metal oxide between metal (or metals) of group VIB to metal (or metals) of group VIII is advantageously between 20 and 1, preferably between 10 and 2.

A preferred catalyst, used in the second stage for treatment of the feedstock of the process according to the invention, advantageously comprises a nickel oxide (NiO) content of between 0.5 and 10% by weight, and preferably between 1 and 5% by weight, and a content of molybdenum oxide ($MoO_3$) of between 1 and 30% by weight, and preferably between 5 and 25% by weight on an amorphous mineral substrate, whereby the percentages are expressed in % by weight relative to the total mass of the catalyst.

The catalyst that is used in the second stage for treatment of the feedstock of the process according to the invention can also advantageously contain at least one doping element that is selected from among phosphorus, silicon, fluorine and boron. This element can advantageously be introduced into the matrix and preferably be deposited on the substrate. It is also possible to deposit silicon on the substrate, by itself or with phosphorus and/or boron and/or fluorine.

The content of doping element by weight of oxide of said element is usually advantageously less than 20% and preferably less than 10%.

A preferred metal-phase catalyst, used in the second stage for treatment of the feedstock of the process according to the invention, comprises a nickel content of between 20% and 70% by weight and preferably between 50% and 60% by weight. The substrate of said catalyst is advantageously selected from the group that is formed by alumina, magnesium oxide, and silica, and preferably the substrate consists of alumina.

In the case of the use of a sulfide-phase catalyst, it is suitable to keep it in contact with a partial H2S pressure that is sufficient to prevent its desulfurization in the presence of hydrogen and with temperatures of the reaction. For this purpose, and in a conventional way, hydrogen sulfide or at least one sulfur compound that decomposes into H2S under the conditions of the second stage is added to the feedstock or directly into the reactor.

As sulfur compound, it is possible to cite dimethyl disulfide (DMDS), carbon disulfide (CS2), organic polysulfides, mercaptans, sulfides, disulfides, oxidized sulfur compounds, and elementary sulfur that is dissolved and/or is partially in suspension.

According to the invention, the catalyst that is used in the first treatment stage that consists of a mild prehydrogenation is a metal-phase catalyst, and the catalyst that is used in the second treatment stage is a sulfur-phase catalyst.

Very preferably, the catalyst that is used in the first treatment stage that consists of mild prehydrogenation is advantageously a nickel catalyst on metal-phase alumina, and the catalyst that is used in the second treatment stage is advantageously a nickel/molybdenum catalyst on sulfide-phase alumina.

In the case of a hydrotreatment that is carried out in two stages, the operation is performed at a low temperature. In addition, maximizing the hydrogenating function also makes it possible to limit the polymerization and/or condensation reactions that lead to the formation of gums that would degrade the stability of catalytic performances.

Stage b): Separation of the Hydrotreated Effluent that is Obtained from Stage a)

According to stage b) of the process according to the invention, the hydrotreated effluent that is obtained from stage a) of the process according to the invention is subjected at least partially, and preferably totally, to one or more separations.

The object of stage b) of the process according to the invention is to separate the gases from liquid and in particular to recover the hydrogen-rich gases that can also contain gases such as carbon monoxide (CO), carbon dioxide ($CO_2$) and propane, and at least one liquid hydrocarbon effluent that consists of at least 50% by weight of linear n-paraffins, preferably at least 80% by weight, very preferably at least 90% by weight, and even more preferably at least 98% by weight of linear n-paraffins, and that has a carbon atom number of between 6 and 25.

The measurement of the contents of paraffins (normal paraffins and iso-paraffins) is carried out according to a chromatographic method. A coupling with a mass spectrometer is used. This method also provides access to contents of olefins, naphthenes, and aromatic compounds (PONA analysis).

A portion of the water that is formed during stage a) for hydrotreatment of feedstocks that are obtained from renewable sources of the process according to the invention is contained in the liquid hydrocarbon effluent, and it is advantageously separated at least partially and preferably totally from the liquid hydrocarbon effluent. Stage b) for separation of the process according to the invention can therefore be followed by a stage for eliminating water.

The mixture of hydrogen gas ($H_2$), carbon monoxide (CO), carbon dioxide ($CO_2$) and separate propane can then advantageously itself undergo treatments that are known to one skilled in the art for eliminating carbon monoxide (CO) and carbon dioxide ($CO_2$) and separating hydrogen from propane, whereby the latter advantageously can be sent to a steam-cracking furnace that is dedicated to the steam-cracking of liquefied gases.

According to the invention, the separate liquid hydrocarbon effluent that is obtained from stage b) of the process according to the invention is then sent at least partially and preferably totally into a steam-cracking furnace, according to stage c) of the process according to the invention.

Stage c): Steam-Cracking of the Liquid Hydrocarbon Effluent that is Obtained from Stage b).

The liquid hydrocarbon effluent that is obtained from stage b) for separation of the process according to the invention and that contains at least 50% by weight of linear n-paraffins, preferably at least 80% by weight, very preferably at least 90% by weight, and even more preferably at least 98% by weight of linear n-paraffins, is at least partially, and preferably totally, sent into a steam-cracking furnace in which these n-paraffins are transformed into ethylene and propylene with noteworthy yields that are clearly superior to those that are obtained in the case where the feedstock that is sent to the steam-cracking device is a conventional feedstock of a steam-cracking device, such as, for example, in the case where the feedstock consists of middle naphtha.

The steam-cracking is generally the process of choice for obtaining basic products of petrochemistry, such as, for example, ethylene and propylene.

Generally, the current feedstocks of the steam-cracking device are obtained in full from petroleum gases and liquids that range from ethane to diesel fuel with variable ethylene and propylene yields according to the quality of the feedstocks.

Advantageously, the operating conditions that are generally used in stage c) for steam-cracking of the process according to the invention are as follows: the steam-cracking device operates at temperatures of between 750 and 850° C. in the presence of injected water vapor, preferably in a ratio by weight relative to the petroleum fraction of between 0.5 and 1.5. The dwell time under these conditions is generally between 0.2 s and 1.2 s.

According to a preferred embodiment of stage c) of the process according to the invention, the liquid hydrocarbon effluent that is obtained from stage b) for separation of the process according to the invention, containing at least 50% by weight of linear n-paraffins, is sent, at least partially and preferably totally, into the steam-cracking furnace mixed with an external petroleum fraction such as, for example, a naphtha fraction or a diesel fuel fraction.

In this case, the yields of ethylene and propylene will be less than those that are obtained with only the liquid hydrocarbon effluent that is obtained from stage b) for separation of the process according to the invention, containing at least 50% by weight of linear n-paraffins.

At the end of the steam-cracking, the products are advantageously separated.

Stage d): Optional Stage for Upgrading Methane: Transformation of Methane into Hydrogen by Vapor Reforming or, According to the English Terminology, Steam Reforming.

The methane that is produced in the steam-cracking unit, in stage c) of the process according to the invention, advantageously can be sent into a vapor-reforming or steam-reforming unit to produce hydrogen according to the following reaction:

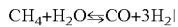
$$CH_4 + H_2O \leftrightharpoons CO + 3H_2$$

whereby the latter takes place under conditions that are well known to one skilled in the art, namely in tubular furnaces that operate at temperatures of between 550 and 850° C. on nickel-on-alumina-based catalysts.

Moreover, it is possible to increase the hydrogen yield by carrying out the conversion of carbon monoxide (CO) or according to the English terminology "shift conversion" according to the following reaction that is also well known:

$$CO + H_2O \leftrightharpoons CO_2 + H_2$$

Owing to these transformations, it is possible to produce at least 5 kg of $H_2$ starting from 22 kg, indicated in Table 1, resulting from steam-cracking 100 kg of n-paraffins.

The reactors for vapor reforming and for conversion of carbon monoxide (CO) can be easily integrated into the steam-cracking installation. The mixture that is produced, rich in hydrogen, can then be sent into the separation train of the steam-cracking device that itself produces the purified hydrogen that is used in various hydrogenations and hydrotreatments of the vapor-reforming effluents.

The significant excess of hydrogen that is produced can thus be used for hydrotreating vegetable oil. Thus, it will be possible to avoid importing hydrogen that is still very expensive and even to export this resource that is very rare in refining but that is the subject of an ever-increasing demand.

One of the advantages of the invention is the use as feedstock of the steam-cracking device of the liquid hydrocarbon effluent that is obtained from stage b) for separation according to the invention and that contains at least 50% linear n-paraffins. The advantage of the use of the liquid hydrocarbon effluent that is obtained from stage b) for separation according to the invention and that contains at least 50% linear n-paraffins as a feedstock of the steam-cracking device is clearly shown in the following examples in which the yields that are obtained according to the invention are compared to those that are obtained by steam-cracking of a direct-distillation middle naphtha.

EXAMPLE 1

Stage a) Hydrotreatment of a Feedstock that is Obtained from Renewable Sources in Two Integrated Stages.
1) First Mild Prehydrogenation Stage.

In a first stage that consists of a reactor that is regulated so as to ensure isothermal operation, a fixed bed of 40 g of mild prehydrogenation catalyst that is based on nickel-on-alumina and that contains 15% calculated weight of nickel, previously reduced, is charged. 100 g/h of pre-refined rapeseed oil whose composition is presented in detail below is sent into this fixed bed.

TABLE 2

Composition of the Feedstock that is Obtained from Renewable Sources

| Fatty Acid Glycerides | Type of Fatty Chain | % by Mass |
|---|---|---|
| Palmitic | C16:0 | 4 |
| Palmitoleic | C16:1 | <0.5 |
| Stearic | C18:0 | 2 |
| Oleic | C18:1 | 61 |
| Linoleic | C18:2 | 20 |
| Linoleic [sic] [- possibly Linolenic] | C18:3 | 9 |
| Arachidic | C20:0 | <0.5 |
| Diesel-fuel | C20:1 | 1 |
| Behenic | C22:0 | <0.5 |
| Erucic | C22:1 | <1 |

100:1 TPN of hydrogen per liter of feedstock (TPN=normal conditions of temperature and pressure) is introduced at 150° C. under a pressure of 4 MPa. After separation of excess hydrogen, a mixture of glycerides with a yield that is slightly higher than 100% is obtained. The prehydrogenated effluent contains the same chains as the starting feedstock in which the double bonds are almost totally hydrogenated. The resulting hydrogen consumption is on the order of 0.9% by weight relative to the feedstock.

2) Second Feedstock Treatment Stage

The prehydrogenated mixture that is obtained from this first stage is directly and completely sent into a second isothermal-operation fixed-bed reactor that is charged with 89 g of a second-stage catalyst for treatment of the feedstock, whereby said hydrotreatment catalyst is based on nickel and molybdenum and has a nickel oxide content that is equal to 4.3% by weight and a molybdenum oxide content that is equal to 21.5% by weight on an alumina substrate, the catalyst being sulfurized in advance. 150: 1 TPN of H2 per liter of feedstock is introduced into this reactor that is kept at 300° C. under a pressure of 4 MPa.

Stage b): Separation of the Effluent that is Obtained from Stage a)

All of the hydrotreated effluent that is obtained from stage a) of the process according to the invention is separated so as to recover a hydrogen-rich gas and a paraffinic liquid hydrocarbon effluent that is separated from the water that is produced. The yields that are obtained are indicated in the following table:

TABLE 3

| Compounds | Yields (% by Weight/Feedstock) |
|---|---|
| CO | 0.42 |
| $CO_2$ | 3.53 |
| $C_1$ | 0.10 |
| $C_2$ | 0.12 |
| $C_3$ | 3.21 |
| $C_4$ | 0.03 |
| $C_5$ | 0.05 |
| Liquid Effluent Paraffinic Hydrocarbon | 85.7 |
| $H_2O$ | 8.52 |
| Total | 101.68 |
| $H_2$ Consumed (% by Weight/Feedstock) | 1.68 |

The paraffinic liquid hydrocarbon effluent that is thus obtained is analyzed by a gas phase chromatography method, coupled with a mass spectrometer: it consists of 98% by weight of n-paraffins having a carbon atom number of 6 to 25 and 2% isoparaffins of between $C_{17}$ to $C_{21}$. At more than 95%, the n-paraffins are included in the range of $C_{16}$ to $C_{22}$.

Stage c): Sending the Paraffinic Mixture into a Steam-Cracking Furnace

All of the liquid hydrocarbon effluent that contains 98% by weight of n-paraffins indicated in Table 2 is sent into a conventional steam-cracking furnace in the presence of water vapor in an $H_2O$/paraffin ratio by weight that is equal to 1 and that operates at a temperature of 800° C. The dwell time in this furnace is 0.5 s.

Starting from 85.7 kg of n-paraffins obtained at the end of the separation stage b) as indicated in Table 3, the following production levels are obtained:

TABLE 4

| Compound | Kg |
|---|---|
| $H_2$ | 0.95 |
| $CH_4$ | 18.8 |
| Ethylene | 36.8 |
| Propylene | 16.2 |

If the propane that is formed in hydrotreatment stage a) of the process according to the invention is separated to be sent into a steam-cracking furnace that is sized to treat liquefied gases, it is possible to obtain the following production levels starting from 3.2 kg of propane, indicated in Table 3:

TABLE 5

| Compound | Kg |
|---|---|
| $H_2$ | 0.05 |
| Ethylene | 1.34 |
| Propylene | 0.53 |

In all, starting from 100 kg of vegetable oil, it is possible to obtain the production levels that are indicated in the following table where the yields that are obtained from middle naphtha and atmospheric diesel fuel are listed for purposes of comparison.

TABLE 6

| | Yields, % by Weight | | |
|---|---|---|---|
| Compounds | Vegetable Oil | Naphtha | Atmospheric Diesel Fuel |
| H2 | 1 | 1 | 0.54 |
| Ethylene | 38.1 | 33.6 | 26.0 |
| Propylene | 16.7 | 15.6 | 16.1 |

The process according to the invention therefore makes it possible to obtain ethylene yields that are very clearly higher than those produced from liquid petroleum fractions while obtaining improved yields of propylene.

The ethylene and the propylene that are produced can then be sent into polymerization units that are known to one skilled in the art so that the final products (polyethylene, polypropylene, . . . ) are obtained integrally from renewable sources.

The invention claimed is:

1. A process for treatment of a feedstock that is obtained from a renewable source that comprises the following stages:
   a) Hydrotreatment in two stages in which said first stage of treatment that comprises a mild prehydrogenation operates at a temperature of between 50 and 300° C., at a partial hydrogen pressure of between 0.1 and 10 MPa, and at an hourly volumetric flow rate on the catalyst of between 0.1 h−1 and 10 h−1, in which said prehydrogenation catalyst comprises at least one noble metal of group VIII that is selected from among palladium and platinum or comprises at least one non-noble metal of group VIII and/or at least one metal of group VIB, whereby the non-noble metal of group VIII is selected from among nickel and cobalt and the metal of group VIB is selected from among molybdenum and tungsten, whereby said prehydrogenation catalyst is a metal-phase catalyst, and in which said second treatment stage operates at a temperature of between 200 and 450° C., at a pressure of between 1 MPa and 10 MPa, at an hourly volumetric flow rate on the catalyst of between 0.1 h−1 and 10 h−1, and at a total quantity of hydrogen that is mixed with the feedstock, such that the hydrogen to feedstock ratio is between 50 and 1,000 Nm3 of hydrogen per m3 of feedstock, in which said catalyst of the second treatment stage comprises at least one non-noble metal of group VIII and/or VIB, whereby the non-noble metal of group VIII is selected from among nickel and cobalt, and whereby the metal of group VIB is selected from among molybdenum and tungsten and is a sulfide-phase catalyst, b) Separation from the hydrotreated effluent that is obtained from stage a) of hydrogen, gases, and at least one liquid hydrocarbon effluent that comprises at least 50% by weight of linear n-paraffins, c) Steam-cracking of at least a portion of the liquid hydrocarbon effluent that is obtained from stage b).

2. A process according to claim 1, in which stage a) comprises a first treatment stage that comprises mild prehydrogenation of at least 99% of the double bonds that are contained in the hydrocarbon chains of the fatty acids of said feedstock, followed by a second treatment stage that comprises hydrogenation of at least 99% of the ester groups that are contained in the hydrocarbon chains of the fatty acids of said feedstock.

3. A process according to claim 1, in which the metal of group VIII of the prehydrogenation catalyst is nickel.

4. A process according to claim 1, in which the metal of group VIB of the prehydrogenation catalyst is molybdenum.

5. A process according to claim 1, in which the catalyst of the prehydrogenation stage comprises nickel-molybdenum or cobalt-molybdenum.

6. A process according to claim 1, in which said prehydrogenation catalyst is a metal-phase catalyst whose metal phase consists of nickel alone.

7. A process according to claim 1, in which the non-noble metal of group VIII of the catalyst of the second treatment stage is nickel.

8. A process according to claim 1, in which the metal of group VIB, catalyst of the second treatment stage, is molybdenum.

9. A process according to claim 7, in which said second treatment catalyst comprises a nickel oxide (NiO) content of between 0.5 and 10% by weight and a molybdenum oxide ($MoO_3$) content of between 1 and 30% by weight on an amorphous mineral substrate, whereby the percentages are expressed in % by weight relative to the total mass of the second treatment catalyst.

10. A process according to claim 1, in which the liquid hydrocarbon effluent that is obtained from stage b) comprises at least 98% by weight of linear n-paraffins.

11. A process according to claim 1, in which the liquid hydrocarbon effluent that is obtained from stage b) is sent completely into a steam-cracking furnace.

12. A process according to claim 11, in which the liquid hydrocarbon effluent that is obtained from stage b) is sent completely into the steam-cracking furnace mixed with an external petroleum fraction such as a naphtha fraction or a diesel fuel fraction.

13. A process according to claim 1, in which the methane that is produced in stage c) is sent into a steam-reforming unit.

14. A process according to claim 1, in which the feedstocks that are obtained from a renewable source are oils and fats of vegetable or animal origin, or mixtures of such feedstocks, containing triglycerides and/or fatty acids and/or esters, whereby said vegetable oils can be raw or refined, total or partial, and whereby said feedstocks contain triglyceride and/or fatty acid structures and their esters, whose fatty chains contain a carbon atom number of between 6 and 25.

15. A process according to claim 7, in which the metal of group VIB, catalyst of the second treatment stage, is molybdenum.

16. A process according to claim 15, in which the catalyst of the prehydrogenation stage comprises nickel-molybdenum or cobalt-molybdenum.

* * * * *